(12) United States Patent
Nakamura

(10) Patent No.: US 7,395,833 B2
(45) Date of Patent: Jul. 8, 2008

(54) CHECK-VALVE FOR REDUCTION OF LEAKAGE CAUSED BY VALVE FLAPPING

(76) Inventor: Akira Nakamura, 1-4-15, Fukami-Higashi, Yamato-shi, Kanagawa, 242-0012 (JP)

( * ) Notice: Subject to any disclaimer, the term of this patent is extended or adjusted under 35 U.S.C. 154(b) by 346 days.

(21) Appl. No.: 11/076,761

(22) Filed: Mar. 10, 2005

(65) Prior Publication Data
US 2006/0201549 A1    Sep. 14, 2006

(51) Int. Cl.
F16K 15/20    (2006.01)
A63H 3/06     (2006.01)

(52) U.S. Cl. .................. 137/223; 137/846; 446/224

(58) Field of Classification Search .............. 137/223, 137/846; 446/220, 221, 224; 5/655.3
See application file for complete search history.

(56) References Cited

U.S. PATENT DOCUMENTS

| | | | |
|---|---|---|---|
| 3,332,415 A * | 7/1967 | Ericson | 446/220 |
| 4,213,267 A * | 7/1980 | Curtis | 446/221 |
| 4,674,532 A | 6/1987 | Koyanagi | |
| 4,917,646 A | 4/1990 | Kieves | |
| 5,188,558 A | 2/1993 | Barton et al. | |
| 5,248,275 A * | 9/1993 | McGrath et al. | 446/224 |
| 5,460,200 A | 10/1995 | Glicksman | |
| 5,830,780 A * | 11/1998 | Dennison et al. | 137/846 |
| 5,878,768 A * | 3/1999 | Tarazaga Carrasco | 446/224 |
| 6,027,394 A | 2/2000 | Tarazaga Carrasco | |
| 6,561,236 B1 * | 5/2003 | Sperry et al. | 141/314 |
| 2004/0064892 A1 * | 4/2004 | Ledvina et al. | 5/655.3 |

* cited by examiner

*Primary Examiner*—John Rivell
(74) *Attorney, Agent, or Firm*—Knoble, Yoshida, & Dunleavy LLC

(57) ABSTRACT

A check valve that reduces leakage caused by flapping is disclosed. The shape of the heat seals focus the flow of gas in the valve so that the flapping that results from using elongated parallel heat seals is reduced. Alternative embodiments also enable tying of balloons while reducing the risk of leaking. Balloons can also be inflated at a greater rate without risk of leakage thereby reducing labor costs and the reduction in leaks also reduces the return of faulty products.

26 Claims, 10 Drawing Sheets

US 7,395,833 B2

CHECK-VALVE FOR REDUCTION OF LEAKAGE CAUSED BY VALVE FLAPPING

BACKGROUND OF THE INVENTION

1. Field of the Invention

The invention relates to the field of valves. In particular the invention relates to check valves that reduce leakage caused by flapping.

2. Description of the Related Technology

The main cause of returned balloon products is because of leaky valves. A number of check valves exist for balloons for permitting the entrance of fluids, such as gasses or water, but not permitting the fluids to then escape from the balloon once the fluid has entered the balloon. A problem with existing valves is that during the inflation process the valve flaps back and forth. When the valve flaps it causes a slight over pressure in the outlet section of the valve. This causes the plastic to stretch and the valve to leak.

FIGS. 1 and 2 show a conventional balloon valve 10. FIG. 1 shows self-sealing valve 10 as placed within non-latex balloon 12. As is well known in the art, balloon 12 includes a body 14 and a stem 16, defined by two flexible plastic balloon sheets 18, 20 that are constructed with a heat-sealable material. Body 14 of balloon 12 is inflatable with an inflation fluid, such as air or helium, through stem 16. Stem 16 extends from a boundary 34, shown as a dashed line in FIG. 1 and extends to the distal end 22.

As shown in FIG. 2, valve 10 is constructed of first and second flexible plastic valve sheets that are sealed or fused along two longitudinal edge lines 50, 52. The first and second sheets have a thickness in the range of 1 to 3 mm. After the sheets are sealed together, the first and second valve sheets cooperate to define a valve inlet 64, valve outlet 66 and valve passageway 68 extending there between. The valve passageway 68 includes an inlet section 70 extending from the valve inlet 64, an outlet section 72 extending from the valve outlet 66, and an interconnecting offset section 74. As shown, the outlet section 72 has a width corresponding to the width of the valve outlet 66, and the inlet section 70 has greater width corresponding to that of the valve inlet 64. The offset section 74 provides a relatively smooth transition between the inlet and outlet sections 70, 72 and defines an offset angle, designated "A" on FIG. 2, in the range of fifteen to forty degrees.

As shown in FIG. 1, valve 10 lies entirely within the balloon 12. That is, a first portion 80 of valve 10 extends into the body 14 and is substantially free or floating. This floating first portion 80 facilitates sealing under pressure in that the floating first portion 80 often partially folds over to crease the valve passageway 68. A second portion 82 of valve 10 extends beyond the boundary 34 and partially into the stem 16. This second portion 82 includes valve inlet 64 and is bonded to the balloon stem 16 in the final assembled balloon state. The second portion 82 of the valve 10 is heat-sealed to the balloon sheets 18, 20.

The outlet section 72, formed by the heat-seal along the parallel edge lines 50 and 52 causes valve 10 to flap back and forth during inflation. When the valve flaps it causes a slight over pressure in the outlet section 72 of valve 10. This causes the plastic to stretch and valve 10 to leak. Utilization of higher-pressure inflators increases the chances that a leak will occur.

Changing the way valve 10 is shaped and heat-sealed will produce a stronger valve that reduces flapping. By reducing flapping, higher pressure inflators can be used which can reduce the overall amount of labor time needed to inflate the balloons and also reduce the loss of product caused by leaky valves.

Therefore, a need exists to produce a valve that reduces overall leakage caused by flapping and therefore reduces the loss of product due to leakage and permits the usage of higher-pressure inflators.

SUMMARY OF THE INVENTION

Accordingly, it is an object of certain embodiments of the invention to provide a check valve for reducing the flapping of inflatable products.

In a first aspect of the invention a check valve is disclosed having first and second sheets of material having peripheral edges. The valve has an outlet portion formed by a first non-parallel set of heat-seals between the first and second sheets of material, wherein the first non-parallel set of heat-seals begins at a first location and ends at a second location, and the distance from the peripheral edges to the second location is greater than the distance from the peripheral edges to the first location. The valve has an outlet located at the second location. The valve has an inlet portion is formed by a second set of heat-seals between the first and second sheets of material and an inlet located on the inlet portion.

In a second aspect of the invention a check valve is disclosed having first and second sheets of material having peripheral edges. The valve has an outlet portion formed by a first set of heat-seals between the first and second sheets of material that are substantially co-linear with the peripheral edges. The valve has an outlet located at a distal end of the outlet portion, wherein the width of the outlet is substantially less than the distance between the peripheral edges. The valve has an inlet portion formed by a second set of heat-seals between the first and second sheets of material and an inlet located on the inlet portion.

In a third aspect of the invention a check valve is disclosed having first and second sheets of material having peripheral edges. The valve has an outlet portion formed by a first set of parallel heat-seals between the first and second sheets of material and an outlet located at a distal end of the outlet portion. The valve has an inlet portion formed by a second set of heat-seals between the first and second sheets of material, an inlet on a distal end of the inlet portion and a plurality of reinforcing heat-seals between the first and second sheets of material formed at locations outside of the inlet portion and the outlet portion.

In a fourth aspect of the invention a method for reducing flapping in an inflatable device is disclosed having the steps of providing a device requiring a check valve; placing a check valve in the device wherein the check valve has first and second sheets of material having peripheral edges. The valve also has an outlet portion formed by a first non-parallel set of heat-seals between the first and second sheets of material, wherein the first non parallel set of heat-seals begins at a first location and ends at a second location, and the distance from the peripheral edges to the second location is greater than the distance from the peripheral edges to the first location. The valve has an outlet located at the second location, an inlet portion formed by a second set of heat-seals between the first and second sheets of material and an inlet located on the inlet portion. The method also has the step of inflating the device.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

The examples provided in this application refer to gas in discussing the flow in the valves, it is to be understood that the term fluid can be used interchangeably with the term gas, and include both liquids as well as gasses. Additionally the valves are not limited to use in balloons but are capable of being used in any situation where a check valve may be used. For example it is possible to use the valves in a variety of other products such cushions, mattresses, inflatable rafts, inflatable toys, etc.

Figure 3:
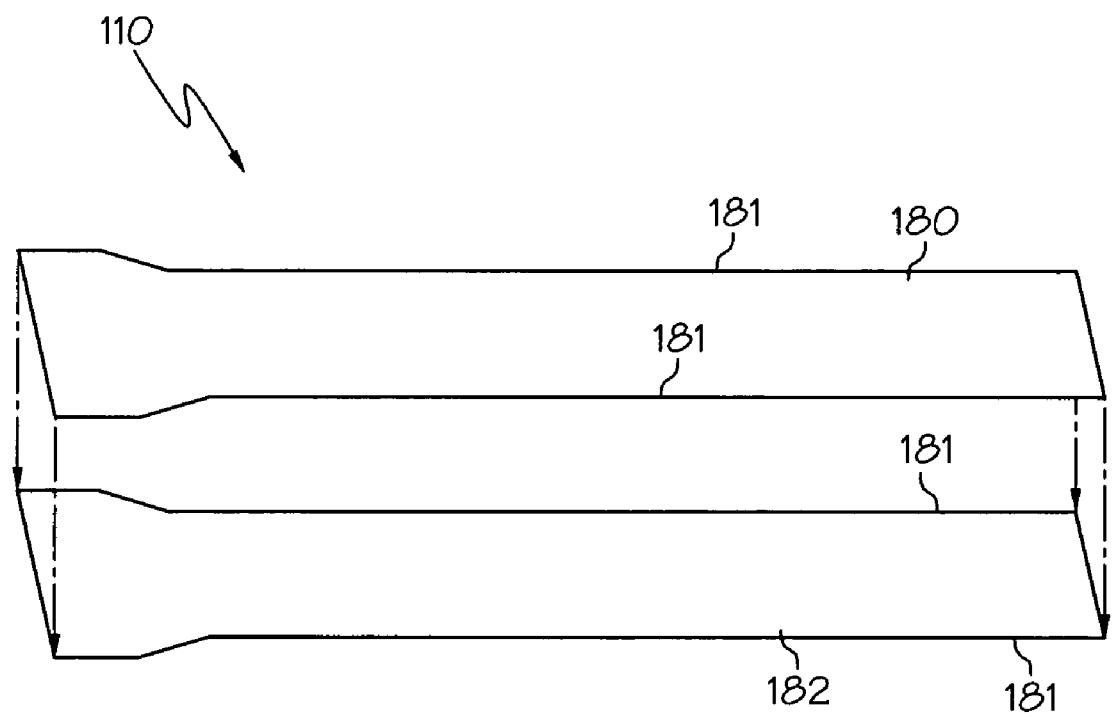
FIG. 3 shows a view of a valve before being heat-sealed.

Referring now to the drawings, wherein like reference numerals designate corresponding structure throughout the views, and referring now to FIG. 3, showing valve 110 before it is heat-sealed and bonded to a balloon.

FIG. 3 shows valve 110 before it is heat-sealed. First flexible plastic valve sheet 180 and second flexible plastic valve sheet 182 are placed together so that the peripheral edges 181 are aligned with each other. The valve sheets are preferably made of a low-density polyethylene material and have a thickness of between 0.25 mm and 3 mm. The valve sheets may also be made of any other suitable material typically used in valve manufacturing. After being placed together first valve sheet 180 is heat-sealed to second valve sheet 182, as discussed in detail below, to fuse the sheets together.

Figure 4:
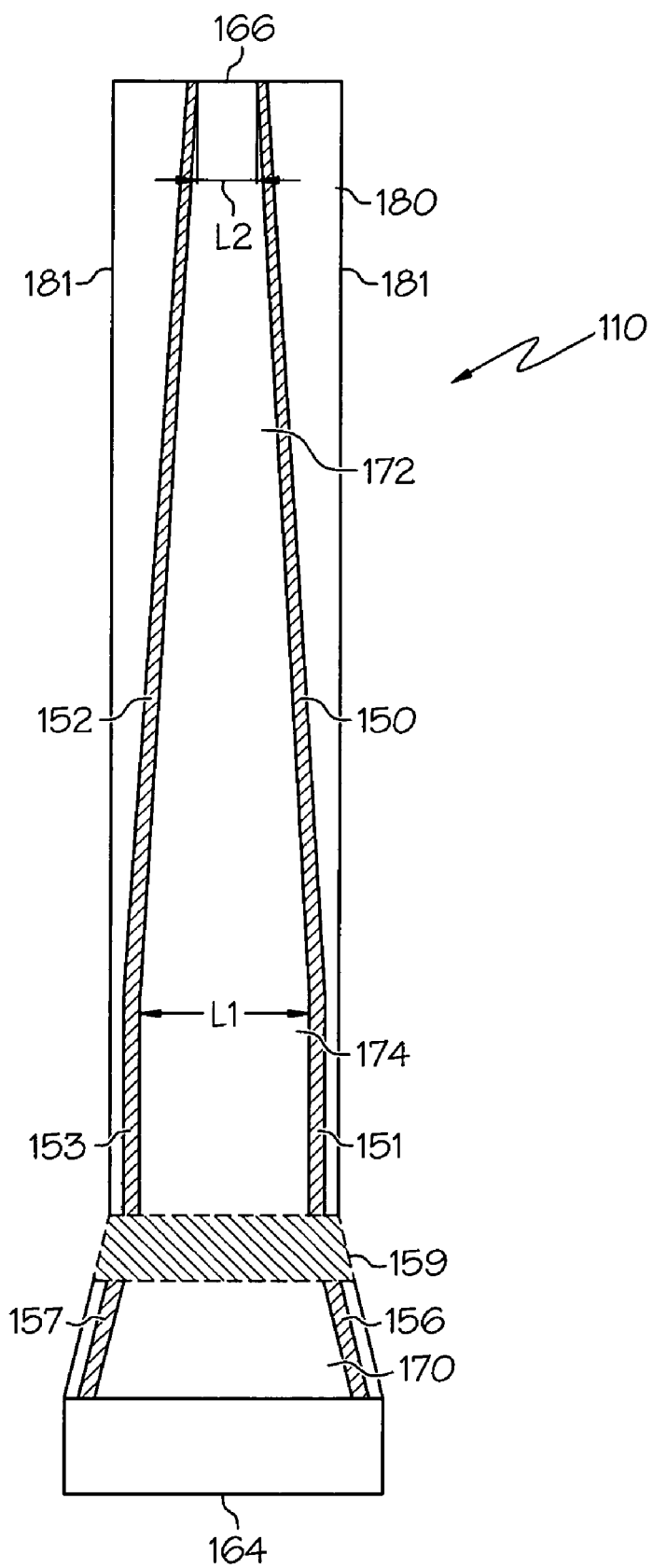
FIG. 4 shows a top down view of a preferred embodiment of the valve.

FIG. 4 shows a top down view of a preferred embodiment of a valve after it has been heat-sealed. Bonding area 159 is created after second valve sheet 182 and first valve sheet 180 have been heat-sealed and secures valve 110 to the stem of the balloon. First and second inlet heat-seals 156, 157 form inlet portion 170 in valve 110. First and second inlet heat-seals 156, 157 are angled with respect to valve inlet 164 in order to focus the flow of gas into valve offset portion 174, formed by first and second offset heat-seals 151, 153. Inlet portion 170 is shaped in order to fit the inflation equipment and preferably corresponds to the width of valve inlet 164.

Valve offset portion 174 is formed by first and second offset heat-seals 151, 153. First and second offset heat-seals 151, 153 are parallel to each other and are separated by a distance $L_1$. The distance L1 is between 15 and 26 mm and is preferably between 19 mm and 21 mm. Minimization of L1 is preferred in order to optimize sealing, but L1 should preferably be greater than the width L2 of outlet 166. Valve offset portion 174 permits a smooth transition of the flow of gas from inlet portion 170 to outlet portion 172. Offset portion 174 increases the pressure of gas flowing through valve 110 thereby reducing potential flapping of valve 110.

The gas then flows through offset portion 174 and into outlet portion 172 formed by first and second outlet heat-seals 150, 152. First and second outlet heat-seals 150, 152 are non-parallel with respect to each other and form an outlet portion 172 that is conical shaped, with the width of the cone decreasing as outlet 166 is approached. Valve outlet 166 has a width of $L_2$, which is between 4 mm and 12 mm, and is preferably between 7.5 mm and 8.5 mm. As the gas flows along outlet portion 172 the increased pressure of the gas caused by the diminishing width of outlet portion 172 prevents flapping of valve 110 during the inflation process.

Typically, when a valve flaps it causes a slight over pressure in the outlet portion. This will cause the plastic sheets to stretch and the valve to leak. The conical shape of outlet portion 172 prevents flapping from occurring thereby reducing the chance of leaks from developing. The reduction in leaks means that fewer balloon products will be returned due to faulty leaks caused by flapping.

Additionally, the reduction in flapping means that higher-pressure inflators can be used. Typically, high-pressure inflators increase the amount of valve flapping during inflation, by reducing the flapping using valve 110, higher-pressure inflators can be used without the subsequent increase in leaky valves. A standard inflator typically works at pressures as low as 0.65 psi with 25. cfm to as high as 30 psi with 16 cfm. Higher inflation rates may be as high as 31 psi with 17 cfm and up to 70 psi with 16 cfm. The highest inflation rates for equipment may be set as high as 150 psi with 35-40 cfm. It is felt that the invention will permit pressures of at least 60 psi with 16 cfm to be used without flapping and as high as 150 psi with 40 cfm with reduced flapping in comparison to standard valves. This can reduce the overall amount of labor time needed to inflate the balloons.

Figure 5:
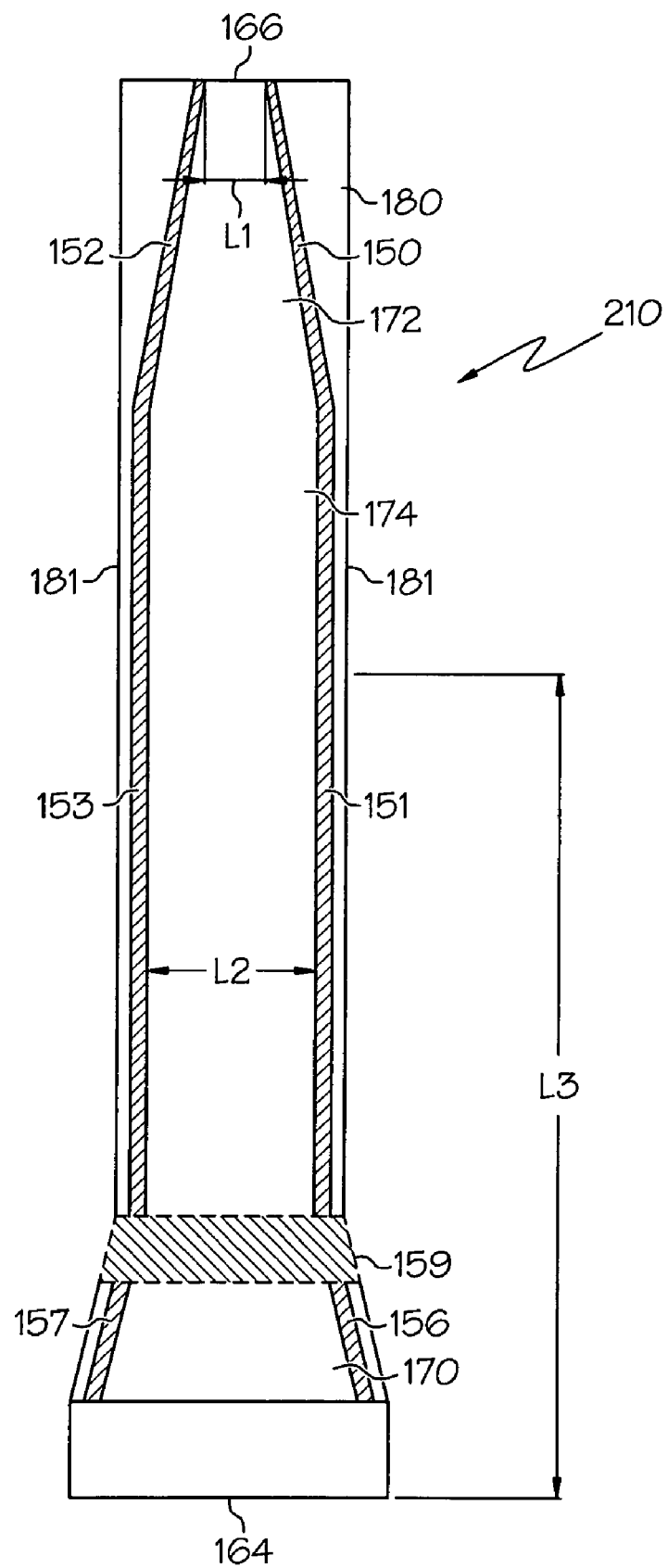
FIG. 5 shows a top down view of an alternative embodiment of the valve shown in FIG. 4.

FIG. 5 shows an alternative embodiment of the valve shown in FIG. 4. The embodiment shown in FIG. 5 is preferably used for the tying of balloons together. Balloons can be tied together by forming a knot with the stem portions of the balloons. Balloons tied together in this fashion can then form pairs, which can be tied to other pairs forming a quad. Balloons tied together in this fashion can be used to form structures made of balloons, such as arches. The act of tying balloons together potentially can damage the valve of the balloon and further cause leakage of the balloon. Replacing balloons tied together for use in decorations is very time consuming and potentially dangerous due to the locations of some decorative arrangements, this further highlights the need to prevent leaky valves. Valve 210 shown in FIG. 5 shows an embodiment of the valve shown in FIG. 4 that has dimensions preferably suited for the tying of balloons together.

In FIG. 5, valve 210 is dimensioned so that it has a reduced width in comparison to valve 110 shown in FIG. 4, and is longer in length than valve 110. The heat-seals that form outlet portion 172, offset portion 174, and inlet portion 170 remain substantially the same shape as shown in FIG. 4. However, the lengths of first and second offset heat-seals 151, 153 are substantially longer in length in order maximize the flexibility of valve 210 for tying while retaining the reduction in the flapping of the valve caused by conical shaped outlet portion 172.

The length of offset portion 174 and inlet portion 170, $L_3$, shown in FIG. 5 is at least 60 mm in length, and is preferably between 80 mm to 120 mm. The length preferably is long enough so that valve 210 extends a substantial distance into the stem of a balloon. The width of offset portion $L_2$ is between 7 mm and 14 mm, and is preferably between 9.5 mm to 10.5 mm. The width of outlet $L_1$ is preferably between 4 mm and 8 mm. The reduction in the widths of the offset portion, $L_2$ and the outlet width, $L_1$ compensate for the increased length of the offset portion, $L_3$, thereby enabling valve 210 to be thinner for tying, while retaining the advantages of the increased pressure in outlet portion 172 that reduces the flapping caused by inflation of the balloon.

Figure 6:
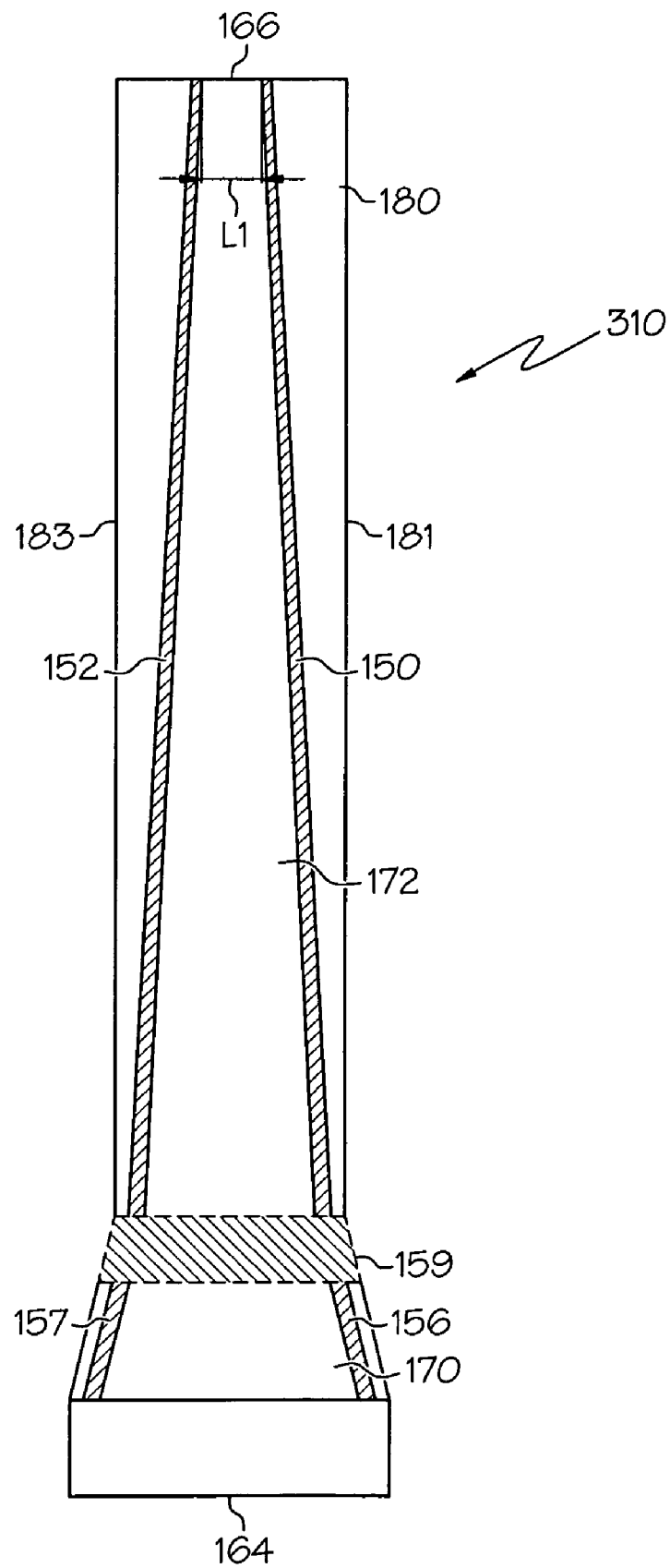
FIG. 6 shows a top down view of an alternative embodiment of the valve shown in FIG. 4.
Figure 7:
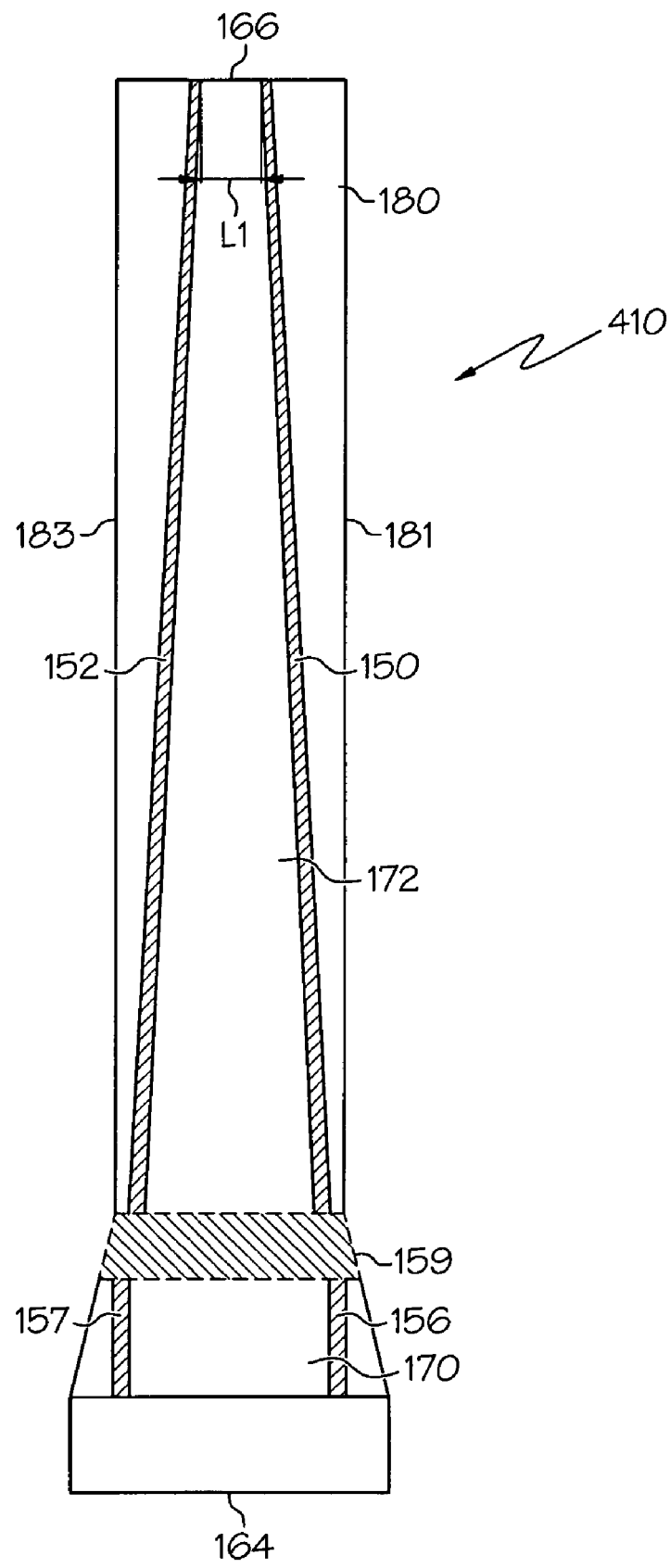
FIG. 7 shows a top down view of an alternative embodiment of the valve shown in FIG. 6.

FIGS. 6 and 7 show valves 310 and 410 respectively, which are alternative embodiments of the valve shown in FIG. 4. Valve 310, shown in FIG. 6, has an inlet portion 170 formed by first and second inlet heat-seals 156, 157 and an outlet portion 172 formed by first and second outlet heat-seals 150, 152. In FIG. 6, first and second inlet heat-seals 156, 157 are non-parallel and are spaced further apart from each other at inlet 164 than at the beginning of outlet portion 172. The spacing of first and second inlet heat-seals 156, 157 enables inlet portion 170 to fit the inflation equipment. Outlet portion 172 forms a conical shape along the remaining length of valve 310 to outlet 166, which has a width, $L_1$, that is substantially less than the width of first valve sheet 180, and is comparable to the outlet width $L_1$ of the embodiment shown in FIG. 4.

The orientation of first and second outlet heat-seals 150, 152 with respect to the peripheral edges 181 of first valve sheet 180 and second valve sheet 182, increases the pressure of the gas flow along outlet portion 172 until reaching outlet 166, thereby reducing the flapping of valve 310. If both the peripheral edges of first and second valve sheets 180, 182 were non-parallel and first and second outlet heat-seals 150, 152 traveled substantially along the peripheral edges 181 of first and second valve sheets 180, 182 and the outlet width was substantially the same as the width of first and second valve sheets 180, 182 the necessary pressure for reducing flapping would not be created. Instead, the width, $L_1$, of outlet 166 and its relation to peripheral edges 181 increases the pressure within outlet portion 172 and causes the reduction in flapping.

Valve 410 shown in FIG. 7 is an alternative embodiment of valve 310 shown in FIG. 6. First and second inlet heat-seals 156, 157 are parallel with respect to each other in this embodiment, instead of conforming to the width of inlet 164. This creates an inlet portion 170 that operates in similar fashion to the offset portions disclosed in the embodiments discussed above. The shape of inlet portion 170 immediately places the incoming gas at higher pressure than previous embodiments and further operates to transition the flow of gas into the narrowing conical shape of outlet portion 172, which runs the entire length of first and second valve sheets 180, 182 from bonding area 159 to outlet 166.

Figure 8:
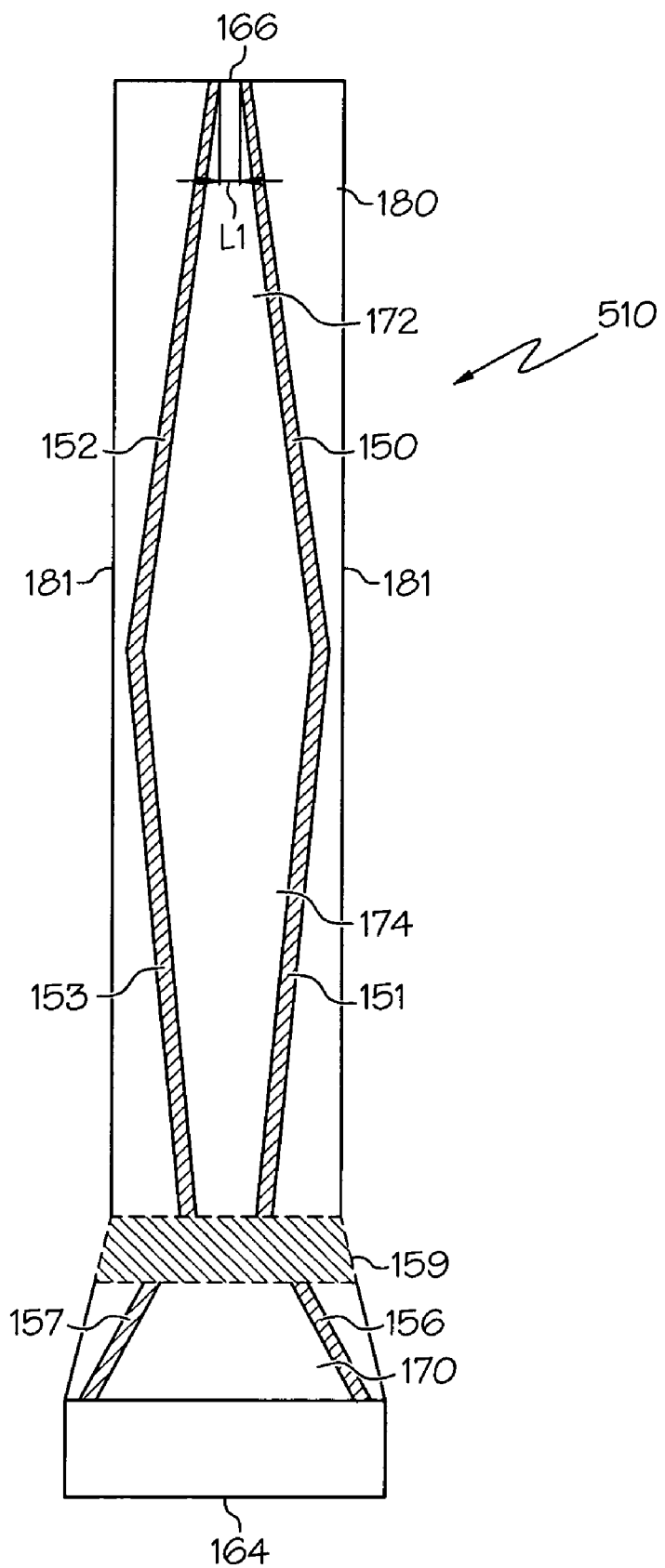
FIG. 8 shows a top down view of an alternative embodiment of the valve shown in FIG. 4.

Valve 510 shown in FIG. 8 is an alternative embodiment of valve 110 shown in FIG. 4. In FIG. 8, offset portion 174 is formed by non-parallel first and second offset heat-seals 151, 153. Offset portion 174 forms a conical shape that is narrower in width where offset portion 174 meets inlet portion 170. The shape of offset portion 174 increases the gas pressure close to inlet 164, while the gas pressure is reduced at the location where outlet portion 172 meets offset portion 174. The gas pressure then increases as the gas moves down outlet portion 172. This creates a counterbalance in pressure near inlet 164 and outlet 166 thereby reducing the overall flapping along the entire length of valve 510.

Figure 9:
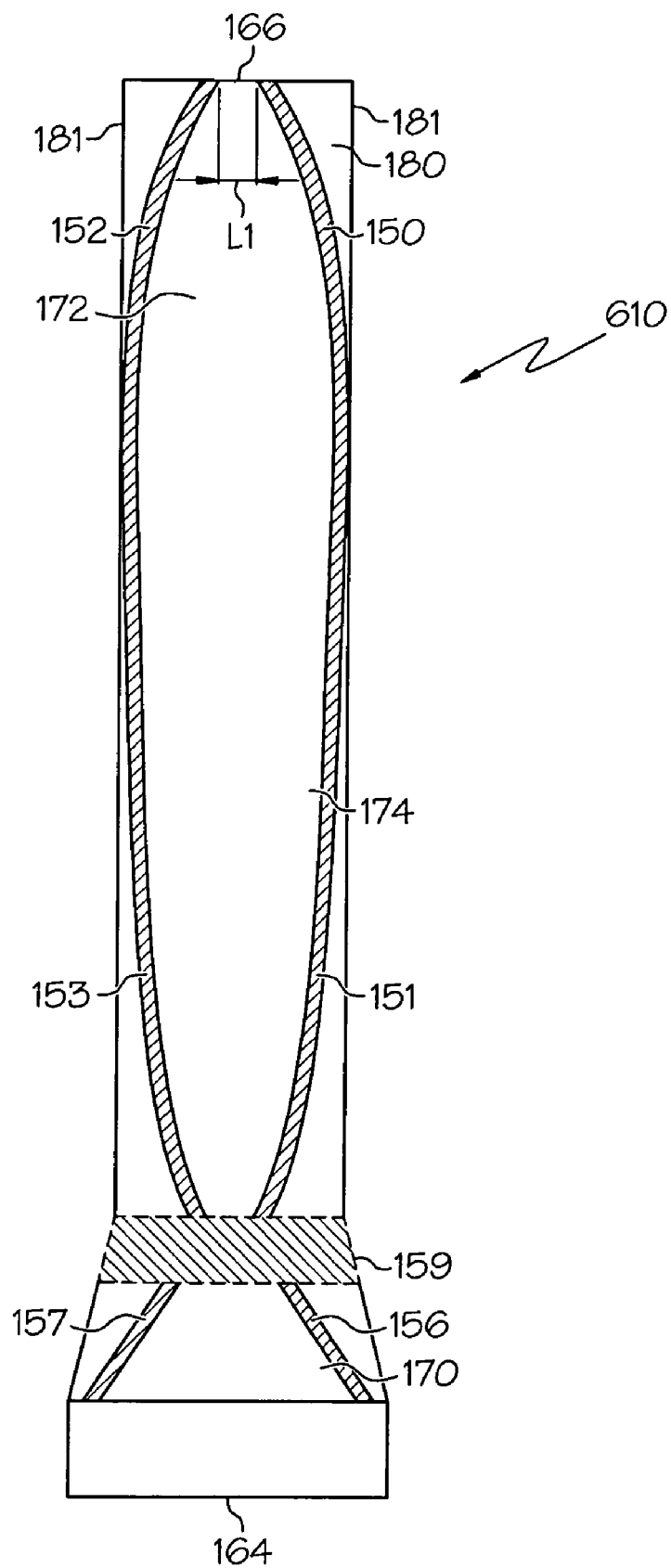
FIG. 9 shows a top down view of an alternative embodiment of the valve shown in FIG. 8.

Valve 610 shown in FIG. 9 is an alternative embodiment of valve 510 shown in FIG. 8. Valve 610 has first and second outlet heat-seals 150, 152 and first and second offset heat-seals 151, 153 that are non-linear in nature and instead are curvilinear. This creates an outlet portion 172 and offset portion 174 that create a more uniform distribution of gas pressure within valve 610 similar to the pressures created in valve 510. The pressures created in valve 610 additionally reduce the overall flapping.

Figure 10:
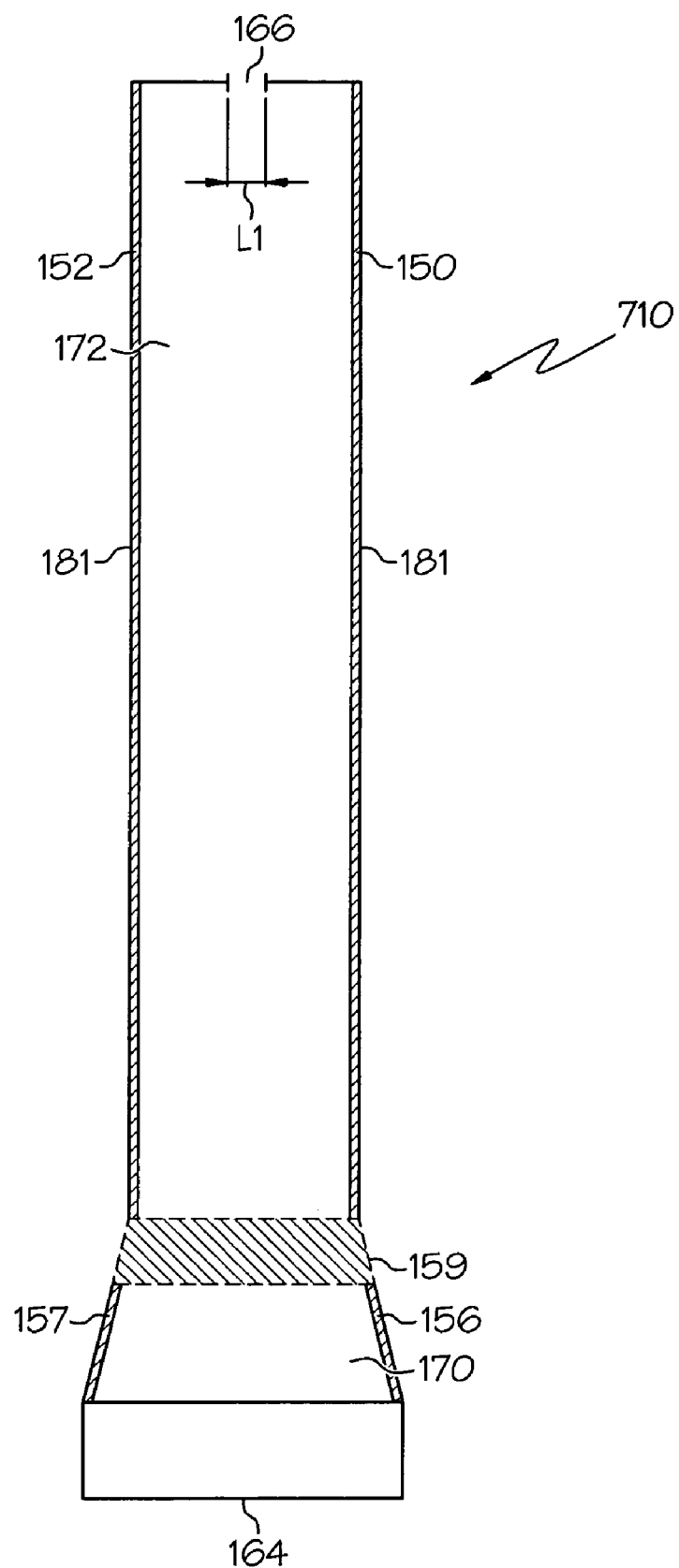
FIG. 10 shows a top down view of an alternative embodiment of a valve.

FIG. 10 shows a top down view of valve 710, which is an alternative embodiment of a valve for reducing flapping. Valve 710 has first and second outlet heat-seals 150, 152 traveling substantially along the peripheral edges 181 of first and second valve sheets 180, 182. The reduction in flapping is caused by the increased pressure in outlet portion 172 caused by the narrow width, $L_1$, of outlet 166, which is substantially similar to the width of the outlet of valve 110. The narrow outlet 166 causes a build up in pressure in outlet portion 172 that reduces the overall flapping of valve 710. Although outlet 166 is shown in the center of valve 710 it is also possible that outlet 166 could be located closer to one of the peripheral edges 181.

Figure 1:
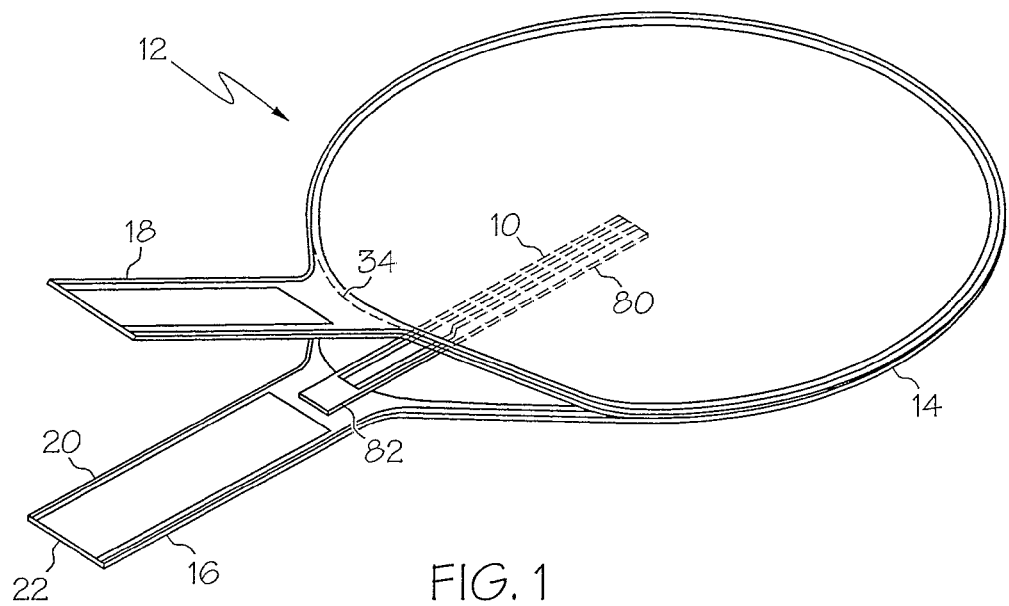
FIG. 1 shows a view of a conventional balloon and balloon valve.
Figure 2:
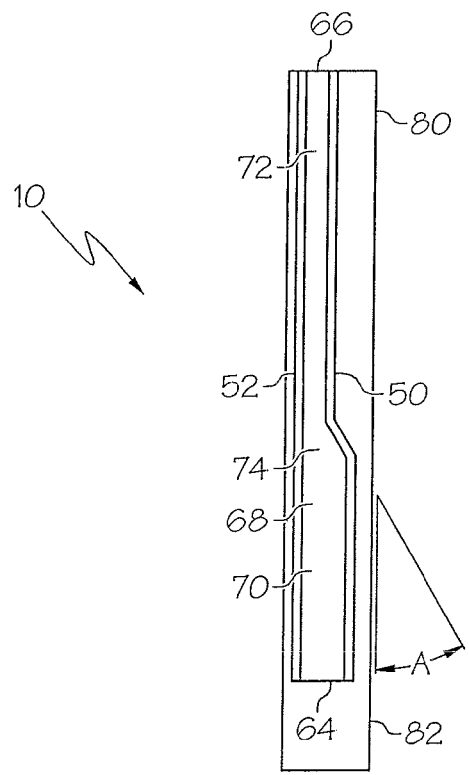
FIG. 2 shows a top down view of the balloon valve shown in FIG. 1.
Figure 11:
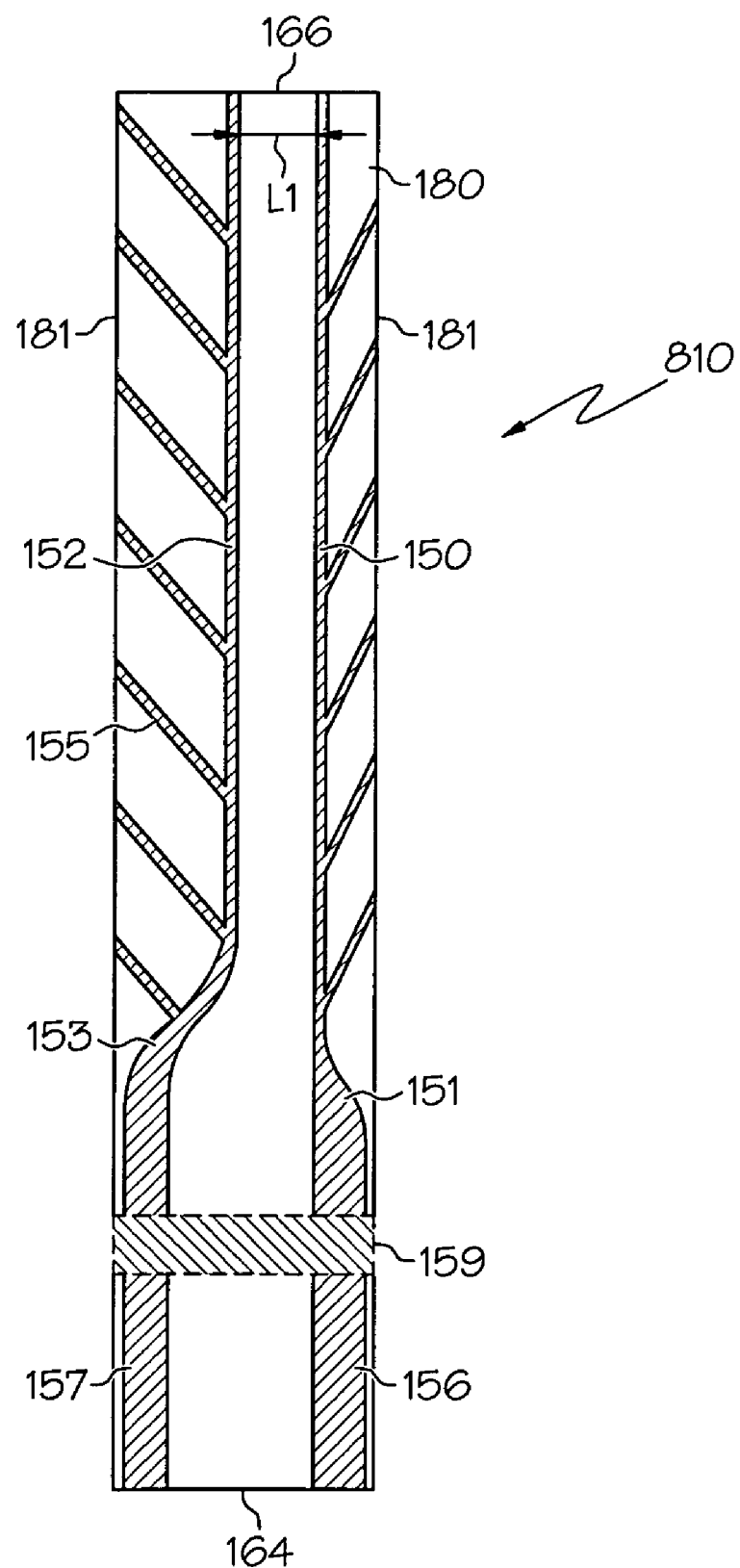
FIG. 11 shows a top down view of an alternative embodiment of the valve shown in FIG. 2 that has additional supporting heat-seals.

FIG. 11 shows a top down view of valve 810, which is an alternative embodiment of the standard valve 10. Valve 810 operates in the same manner as valve 10 shown in FIGS. 1 and 2, however valve 810 has reinforcing heat-seals 155 extending from first and second outlet heat-seals 150, 152 and first and second offset heat-seals 151, 153. Reinforcing heat-seals 155 extend from outlet heat-seals 150, 152 and offset heat-seals 151, 153 to the peripheral edges 181 of first and second valve sheets 180, 182. Reinforcing heat-seals 155 create a rigidity that further prevents flapping. Reinforcing heat-seals 155 prevent the valve sheets 180, 182 from stretching and thereby prevent the leaks that come from the stretching of valve sheets.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A check valve comprising: first and second sheets of material having peripheral edges; an outlet portion formed by a first non-parallel set of heat-seals between said first and second sheets of material, wherein said first non parallel set of heat-seals begins at a first location and ends at a second location, and the distance from said peripheral edges to said second location is greater than the distance from said peripheral edges to said first location; an outlet located at said second location; a bonding area spanning the peripheral edges; an inlet portion formed by a second set of heat-seals between said first and second sheets of material; and an inlet located on said inlet portion.

2. The check valve of claim 1, further comprising an offset portion formed by a third set of heat-seals between said first and second sheets of material.

3. The check valve of claim 2, wherein said third set of heat-seals are parallel.

4. The check valve of claim 2, wherein said third set of heat-seals are non-parallel.

5. The check valve of claim 4, wherein said third set of heat-seals are curvilinear.

6. The check valve of claim 2, wherein the width of said outlet is between 4 mm and 12 mm.

7. The check valve of claim 2, wherein the width of said outlet is between 4 mm and 8 mm.

8. The check valve of claim 2, wherein the distance between said heat-seals in said third set of heat seals is between 15 and 26 mm.

9. The check valve of claim 2, wherein the distance between said heat-seals in said third set of heat seals is between 7 mm and 14 mm.

10. The check valve of claim 2, wherein the length of said offset portion and said inlet portion is at least 60 mm.

11. The check valve of claim 1, wherein the second set of heat-seals is non-parallel.

12. The check valve of claim 11, wherein said inlet is adapted for receiving inflators.

13. A check valve comprising:
    first and second sheets of material having peripheral edges;
    an outlet portion formed by a first set of parallel heat-seals between said first and second sheets of material;
    an outlet located at a distal end of said outlet portion,
    an inlet portion formed by a second set of heat-seals between said first and second sheets of material;
    an inlet located on said inlet portion; and
    a plurality of reinforcing heat-seals between said first and second sheets of material formed at locations outside of said inlet portion and said outlet portion.

14. The check valve of claim 13, wherein said reinforcing heat-seals are located in an area between said peripheral edges and said outlet portion.

15. The check valve of claim 13, wherein said reinforcing heat-seals are not parallel with said peripheral edges.

16. A method for reducing flapping in a balloon comprising the steps of: providing a device requiring a check valve; placing a check valve in said device wherein said check valve comprises; first and second sheets of material having peripheral edges; an outlet portion formed by a first non-parallel set of heat-seals between said first and second sheets of material, wherein said first non parallel set of heat-seals begins at a first location and ends at a second location, and the distance from said peripheral edges to said second location is greater than the distance from said peripheral edges to said first location; an outlet located at said second location; an inlet portion formed by a second set of heat-seals between said first and second sheets of material; a bonding area spanning the peripheral edges; and an inlet located on said inlet portion; and inflating said balloon.

17. The method of claim 16, wherein said check valve further comprises an offset portion formed by a third set of heat-seals between said first and second sheets of material.

18. The method of claim 17, wherein said third set of heat-seals are parallel.

19. The method of claim 17, wherein said third set of heat-seals are non-parallel.

20. The method of claim 19, wherein said third set of heat-seals are curvilinear.

21. The method of claim 17, wherein the width of said outlet is between 4 mm and 12 mm.

22. The method of claim 17, wherein the width of said outlet is between 4 mm and 8 mm.

23. The method of claim 17, wherein the distance between said heat-seals in said third set of heat seals is between 15 and 26 mm.

24. The method of claim 17, wherein the distance between said heat-seals in said third set of heat seals is between 7 mm and 14 mm.

25. The method of claim 17, wherein the length of said offset portion and said inlet portion is at least 60 mm.

26. The method of claim 16, wherein the second set of heat-seals is non-parallel.

* * * * *